July 7, 1964    F. H. CLARKSON ETAL    3,139,800
HOLDER FOR MILLING CUTTERS AND LIKE ROTARY TOOLS
Filed Nov. 9, 1961
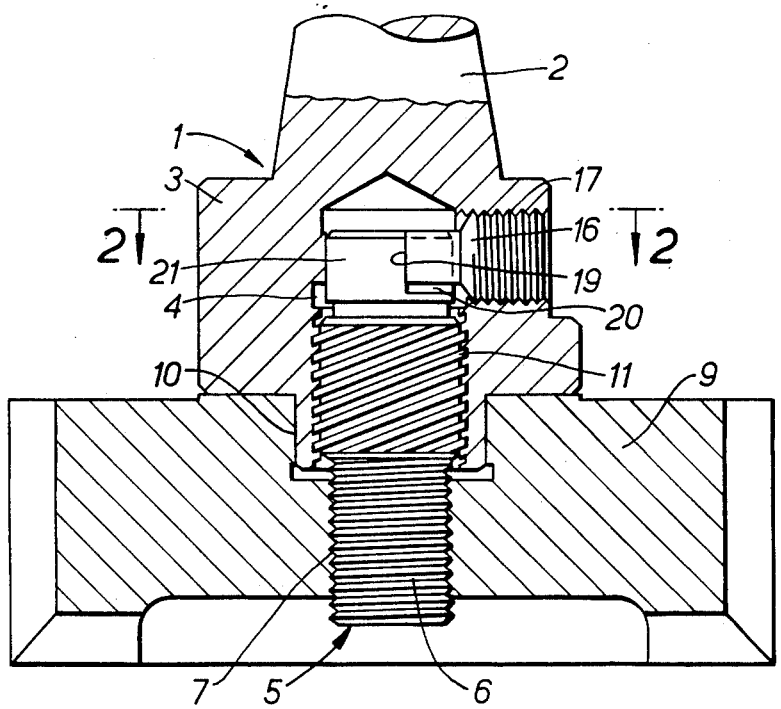
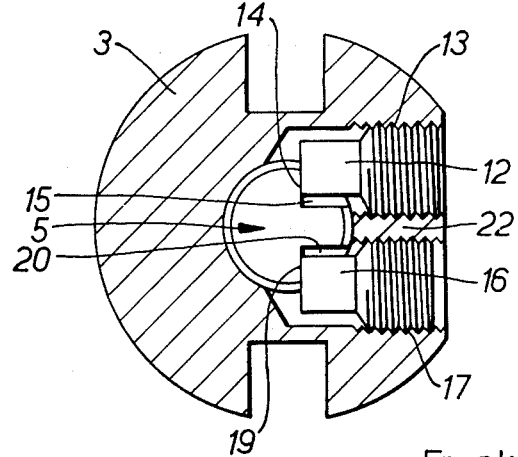
Inventors:-
Frank Henry Clarkson
John Barry Clarkson
Geoffrey Horton

3,139,800
HOLDER FOR MILLING CUTTERS AND LIKE ROTARY TOOLS

Frank Henry Clarkson and John B. Clarkson, Coventry, and Geoffrey Horton, Nuneaton, England, assignors to Clarkson (Engineers) Limited, Nuneaton, England, a British company
Filed Nov. 9, 1961, Ser. No. 151,246
2 Claims. (Cl. 90—11)

This invention relates to tool holders in the nature of arbors or shanks for receiving milling cutters or like rotary tools screwed thereon and is concerned with that kind of holder wherein a co-axial member is provided in a co-axial bore in the holder body, said co-axial member having a threaded portion at the forward end of the holder for screw threaded engagement with a milling cutter or like rotary tool for mounting the latter at the forward end of the holder body.

The object of the invention is to provide an improved tool holder of the above mentioned kind capable of simple and robust construction and whereby firm and accurate mounting of a milling cutter or like rotary tool may be obtained especially for heavy duty work yet at the same time release of the tool for removal from the holder may be readily effected when required.

In the accompanying drawings:

FIGURE 1 is a view mainly in axial plane section of a holder, according to this invention and FIGURE 2 is a cross section taken on the line 2—2 of FIGURE 1.

Referring to the drawings, the holder body or arbor 1 may be of the usual form having a rear taper shank 2 for mounting purposes and a forward portion or head 3 provided with a co-axial bore 4 open at the leading end.

In a manner hereafter described the co-axial bore 4 receives a co-axial member which may be in the nature of a plug or shaft 5 and which in position of use has a forward end portion 6 protruding from the leading end of the holder body, which forward portion 6 is threaded for engagement with the threaded bore 7 of a milling cutter or like rotary tool 9. When fully screwed onto the threaded forward portion of the shaft 5 the rear part of the tool 9 has a spigoted location at 10 about the leading end of the body forward portion or head 3 and also abuts against the latter.

For the purpose of this invention that part of the shaft 5 received by the co-axial bore 4 has a helical or screw threaded engagement 11 of non-locking helix angle with a correspondingly formed or threaded part of the bore 4 so that even though a milling cutter or tool 9 may become tightly screwed onto the threaded forward portion 6 of the shaft 5 and into hard abutment against the head 3, the shaft 5 may be readily unscrewed in relation to the chuck body 1 for freeing the tool 9.

Thus where the shaft 5 is of the order of 1″ in diameter a multi-start (e.g. 15 start) thread having a non-locking helix angle of 20° or thereabouts may be employed at 11 the thread being preferably of acme form whilst the threaded forward portion 6 of the shaft 5 which engages the tool 9 is of the usual form e.g. a 2 start thread of 12 t.p.i. (threads per inch). It is to be emphasised that these figures are given by way of example only and may be varied to suit different requirements. The non-locking thread at 11 is of the same hand as that of the threaded forward portion 6 i.e. usually right handed.

In order to releasably retain the shaft 5 against unscrewing movement in the bore 4 an abutment or stop element is provided on the holder body 1 and which is shown consisting of a set screw 12 threaded in an offset bore 13 in the head 3, the inner end of the screw being arranged to abut a face 14 on the shaft 5 which face is provided in a correspondingly offset recess 15 in the side of the shaft 5.

With the shaft 5 screwed into position in the bore 4 the screw 12 is screwed into side abutment with the shaft 5 at the face 14 which thus locks the shaft 5 against unscrewing movement relative to the chuck body 1. When it is desired to permit unscrewing movement of the shaft 5 in order to free a milling cutter 9 that has become tightly screwed against the head 3, the set screw 12 is unscrewed a sufficient distance away from the surface 14 to allow sufficient unscrewing movement of the shaft 5 for release of the tool 9. After such unscrewing movement of the shaft 5 the screw 12 should still provide an abutment for the surface 14 in order to prevent undue or complete unscrewing movement of the shaft 5 out of the bore 4, which might otherwise cause damage and/or injury.

When screwing or fully screwing the shaft 5 into position in the bore 4 the set screw 12 is unscrewed or removed so as not to hinder rotation of the shaft 5. With the latter in the required position the screw 12 is then screwed home into locking abutment with the surface 14.

Under heavy working conditions the cutter 9 may become so tightly screwed against the head 3 such that the shaft 5 does not readily unscrew on release of the set screw 12 despite the non-locking helix angle of the thread at 11. In order to cater for such an occurrence a further or release element or screw 16 is shown threaded in a bore 17 for cooperation with a corresponding face 19 in a further recess 20 in the shaft 5. By screwing the screw 16 against the face 19 the shaft 5 can be initially turned or eased in the unscrewing direction sufficient to free it for required slackening movement.

In addition to its release function as just described, the screw 16 may be also screwed against its co-operating face 19 in a similar manner to the locking screw 12 as shown in FIGURE 2 in order to positively lock the shaft 5 against rotation in either direction. In this way the screw 16 is ready for any release operation that may be necessary after the locking screw 12 has been unscrewed.

The elements or screws 12, 16, should operate at right angles to the axis of the shaft 5 and as shown in FIGURE 2 can be conveniently disposed side by side for ease of operation.

The shaft is provided with a plain or substantially plain cylindrical portion 21 having a locating fit in a corresponding part of the bore 4. Whereas a single face across the shaft 5 may in effect provide the faces 14, 19, the recesses 15, 20, are preferably divided by the intervening portion 22 so that a minimum of interruption of the plain cylindrical portion 21 is caused.

Owing to the cutter release action that is made possible, key access to the outer end of the shaft 5 is unnecessary so that cutters having closed end faces may be employed.

We claim:

1. A tool holder for rotary tools of the character described comprising a body having a mounting shank and an axial bore open at the leading end of said body, said leading end being formed for spigotted engagement with a rotary tool; a co-axial member having a screw engagement of non-locking helix angle in said axial bore of the holder body and having a pair of adjacent side abutment faces disposed within said bore whilst a forward protruding portion of said co-axial member is threaded for receiving a rotary tool in normal screw threaded engagement thereon and in spigotted engagement about and against the forward end of the holder body, said non-locking screw engagement of the co-axial member in the holder body permitting unscrewing of the co-axial member for freeing a rotary tool that has become tightly screwed on said co-axial member and against the forward end of the holder body; and a pair of separately operable screws disposed side by side in the holder body for movement into and out of corresponding side abutment with said faces of the co-axial member for the purposes of locking the latter against rotation and for enabling release unscrewing rotation thereof to be obtained.

2. A holder for rotary tools of the character described according to claim 1 wherein the said side abutment faces of the co-axial member are provided in an otherwise plain cylindrical portion of said co-axial member which plain cylindrical portion has a locating fit in a complementary plain cylindrical inner end portion of the axial bore of the holder body.

References Cited in the file of this patent

UNITED STATES PATENTS

| | | |
|---|---|---|
| 473,818 | Binns | Apr. 26, 1892 |
| 1,615,233 | Redinger | Jan. 25, 1927 |
| 1,943,879 | Rea | Jan. 16, 1934 |
| 2,005,498 | Hart | June 18, 1935 |
| 2,368,736 | Wyrick | Feb. 6, 1945 |